United States Patent [19]
Park et al.

[11] Patent Number: 5,920,237
[45] Date of Patent: Jul. 6, 1999

[54] CONSTANT ENVELOPE QUADRATURE-QUADRATURE AMPLITUDE MODULATION SYSTEM

[75] Inventors: In Jae Park, Kyungki-do; Woo Hyung Lee, Seoul, both of Rep. of Korea

[73] Assignee: Daewoo Telecom Ltd, Incheon, Rep. of Korea

[21] Appl. No.: 08/971,061

[22] Filed: Nov. 14, 1997

[30] Foreign Application Priority Data

Nov. 19, 1996 [KR] Rep. of Korea .................. 1996-55451

[51] Int. Cl.[6] .................................................. H04L 27/36

[52] U.S. Cl. ............................................ 332/103; 375/298

[58] Field of Search ................................. 332/103, 104, 332/105; 375/261, 298

[56] References Cited

U.S. PATENT DOCUMENTS

| | | | |
|---|---|---|---|
| 5,638,401 | 6/1997 | Jones | 332/103 |
| 5,784,412 | 7/1998 | Ichihara | 332/103 |

*Primary Examiner*—Siegfried H. Grimm
*Attorney, Agent, or Firm*—Lilling & Lilling P.C.

[57] ABSTRACT

A constant envelope quadrature-quadrature amplitude modulation system limits the data, which will be transmitted, to 4-bit and adds 4-bit parity to make them have a constant envelope in the $Q^2AM$ system, which modulates 8-bit in units of 2-bit. The system includes: a constant envelope encoder 52 for adding 4-bit parity to 4-bit input information; four mappers 12 to 15 for respectively generating level signals corresponding to data values of 2-bit among 8-bit data generated by the constant envelope encoder 52; four mixers 16 to 19 for respectively mixing the level signals generated by the four mappers 12 to 15 with different predetermined frequency signals; and adder 20 for adding up the signals generated by the four mixers 16 to 19.

18 Claims, 10 Drawing Sheets

CONSTANT ENVELOPE QUADRATURE-QUADRATURE AMPLITUDE MODULATION SYSTEM

BACKGROUND OF THE INVENTION

1. Field of the Invention

The present invention relates to a quadrature-quadrature amplitude modulation ($Q^2$AM). Specifically, this invention is a $Q^2$AM method and apparatus for making a modulated signal have a constant envelope.

2. Discussion of Related Art

As information is getting important in the recent society, many communication terminals, such as a personal communication terminal and a mobile communication terminal, have been developed and spread. Since these communication terminals usually operate digitally, and transmit data through radio, they employ a digital modulation system which mixes digital data with a specified frequency signal, such as sine or cosine wave in signal transmission.

The conventional digital modulation system employed by a mobile or personal communication system is a quadrature phase shift keying (QPSK) system or a minimum shift keying (MSK) system. Under the present communication environment where frequency resource is limited, the modulation method described above cannot satisfy the requirements of high speed transmission and mass information transmission, such as image data transmission.

To solve these problems, a $Q^2$AM system, where bandwidth efficiency is improved, has been developed by combining two existing systems, a quadrature-quadrature PSK ($Q^2$PSK) system and a quadrature amplitude modulation (QAM) system.

FIG. 1 is a block diagram of a $Q^2$AM system according to prior art.

Serial-to-parallel converter 11 receives 8-bit data (m1, m2, m3, m4, m5, m6, m7, m8) in serial and outputs the data in parallel in the unit of 2-bit. Mappers 12 to 15 convert the respective 2-bit data, transmitted from serial-to-parallel converter 11, into level signals corresponding to relevant data values.

If it is assumed that odd input data is Mi, and even input data is Mj, mappers 12 to 15 generate specified level signals corresponding to input data values as shown in the following Table 1;

TABLE 1

| Mi | Mj | Output ($a_i$) |
|---|---|---|
| 0 | 0 | +3β |
| 0 | 1 | +1β |
| 1 | 0 | −1β |
| 1 | 1 | −3β | where β, as a parameter, is related to average signal energy $E_S$ by $\sqrt{E_{S/10}}$.

Mixers 16 to 19 respectively mix the level signals ($\alpha_1$ to $\alpha_4$), generated by mappers 12 to 15, with specified frequency signals [$S_1(t)$ to $S_4(t)$]. The frequency signals [$S_1(t)$ to $S_4(t)$] are respectively expressed as the following formulas 1 through 4.

$$S_1(t) = \sin(\pi t/2T) \cos 2\pi f_c t \quad \text{[Formula 1]}$$

$$S_2(t) = \cos(\pi t/2T) \cos 2\pi f_c t \quad \text{[Formula 2]}$$

$$S_3(t) = \sin(\pi t/2T) \sin 2\pi f_c t \quad \text{[Formula 3]}$$

$$S_4(t) = \cos(\pi t/2T) \sin 2\pi f_c t \quad \text{[Formula 4]}$$

Adder 20 sums up the frequency signals generated by mixers, 16 to 19, and generates a signal, [$S_{Q^2AM}(t)$]. This signal is defined by the following formula 5.

$$S_{Q^2AM}(t) = \alpha_1 \cdot \sin(\pi t/2T) \cos 2\pi f_c t + \alpha_2 \cdot \cos(\pi t/2T) \cos 2\pi f_c t + \alpha_3 \cdot \sin(\pi t/2T) \sin 2\pi f_c t + \alpha_4 \cdot \cos(\pi t/2T) \sin 2\pi f_c t \quad \text{[Formula 5]}$$

In the $Q^2$AM system, 8-bit data is simultaneously modulated. When expressing a signal interval corresponding to one bit data as a Tb, each data bit is output for 8-Tb. During that time, the 8-bit data is input to serial-to-parallel converter 11.

FIG. 2 is a graph illustrating a frequency spectrum of a modulated signal, which will be transmitted through radio. As already known, when the period of the signal is T, the bandwidth of transmitting and receiving frequency is set to 1/T. The bandwidth of a signal according to the above $Q^2$AM system becomes 1/(8Tb). Therefore, the bandwidth efficiency in the $Q^2$AM system is quadruple 1/(2Tb) in the QPSK system, or octuple 1/Tb in the PSK system. Moreover, the $Q^2$AM system can improve the bandwidth efficiency of the QAM system by two times.

FIG. 3 is a block diagram of a receiver for receiving and demodulating the quadrature-quadrature amplitude modulated signal by the $Q^2$AM system.

Mixers 31 to 34 mix the received $Q^2$AM signal with the specified frequency signals, [$S_1(t)$ to $S_4(t)$], used in the transmitter. Integrators 35 to 38 integrate the signals generated by mixers 31 to 34 during one symbol interval, or 8-Tb. Demappers 39 to 42 determine the levels of the integrated signals generated by Integrators 35 to 38 and generate 2-bit data corresponding to the relevant levels, respectively. Parallel-to-serial converter 43 receives the data bits from demappers 39 to 42 in parallel and outputs them in serial.

If the $Q^2$AM signal expressed in the formula 5 is received in such the configuration, the received signal is respectively mixed with the frequency signals, [$S_1(t)$ to $S_4(t)$] by mixers 31 to 34, which are identical with the signals mixed in the transmitter, and the mixed signals are integrated by integrators 35 to 38 during one symbol interval, 8-Tb, thus detecting the signal levels corresponding to the level signals generated by mappers 12 to 15 shown in FIG. 1. The level signals generated by integrators 35 to 38 are determined by demappers 39 to 42, thus detecting 2-bit data which corresponds to a relevant level signal according to a regulation as shown in the table 1. The data is then converted into serial data by parallel-to-serial converter 43, thus outputting the same 8-bit data that was forwarded by the transmitter.

However, the conventional $Q^2$AM system described above has the following problems.

When the data which is input to the modulator is "00110100 11101001 01010011 . . . " in the $Q^2$AM system, data "00 11 01 . . . " is applied to mapper 12 shown in FIG. 1, thus mixer 16 generates a signal $\alpha_1 S_1(t)$ shown in FIG. 4. Through the same method, mixers 17 to 19 respectively generate signals $\alpha_2 S_2(t)$, $\alpha_3 S_3(t)$ and $\alpha_4 S_4(t)$ as shown in FIG. 4. If the signals shown in FIG. 4 are summed up by adder 20, a signal $S_{Q^2AM}(t)$ shown in FIG. 4 is produced. The signal, [$S_{Q^2AM}(t)$], generated by adder 20, has different envelopes according to data to be modulated.

For radio communication, since it is necessary to amplify the level of a signal forwarded through an antenna, a high power amplifier must be installed at the front stage of the antenna. Especially, since data must be transmitted between a land station and an artificial satellite, a high power amplifier must be installed at the output stage in a satellite communication system.

Usually a class C amplifier is employed as the high power amplifier to increase electric power efficiency. Since an input-to-output characteristic in the class C amplifier is non-linear, the phase is deviated in accordance with the change of an amplitude signal when the amplitude of an input signal changes. This deteriorates the performance of the system. Therefore, the input signal to the high power amplifier, such as a class C amplifier, must have a constant envelope.

However, since the amplitudes of output signals change according to output data in the conventional $Q^2AM$ system, the $Q^2AM$ system cannot be used in a non-linear communication system even though it has high bandwidth efficiency.

SUMMARY OF THE INVENTION

Accordingly, the present invention is directed to a constant envelope $Q^2AM$ (CE-$Q^2AM$) method and apparatus that substantially obviates one or more of the limitations and disadvantages of the related art.

An object of the present invention is to provide a CE-$Q^2AM$ method and apparatus.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a method for a $Q^2AM$ includes the steps of: inputting 4-bit information; adding 4-bit parity to the information bits to make 8-bit data having a constant envelope; converting the 8-bit data into corresponding level signals by 2-bit; mixing the level signals with different predetermined frequency signals, respectively; and adding up signals obtained through mixing.

In another aspect, the present invention provides an apparatus for a $Q^2AM$ including: an encoding unit for adding 4-bit parity to 4-bit input information; first, second, third, and fourth mapping units for respectively generating level signals corresponding to data values of 2-bit among 8-bit generated by the encoding unit; first, second, third, and fourth mixers for respectively mixing the level signals generated by the four mapping units with different predetermined frequency signals; and an adding unit for adding up the signals generated by the four mixers.

The first and second mapping units respectively convert 2-bit input data into at least one level signal among the values of −1.18 to −1.25, +1.18 to +1.25, −2.90 to −2.95, +2.90 to +2.95, preferably among the values of −1.21, +1.21, +2.92.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the attached drawings, a preferred embodiment of the present invention is described below.

First, basic concept of the present invention is set forth in the following description.

Figure 1:
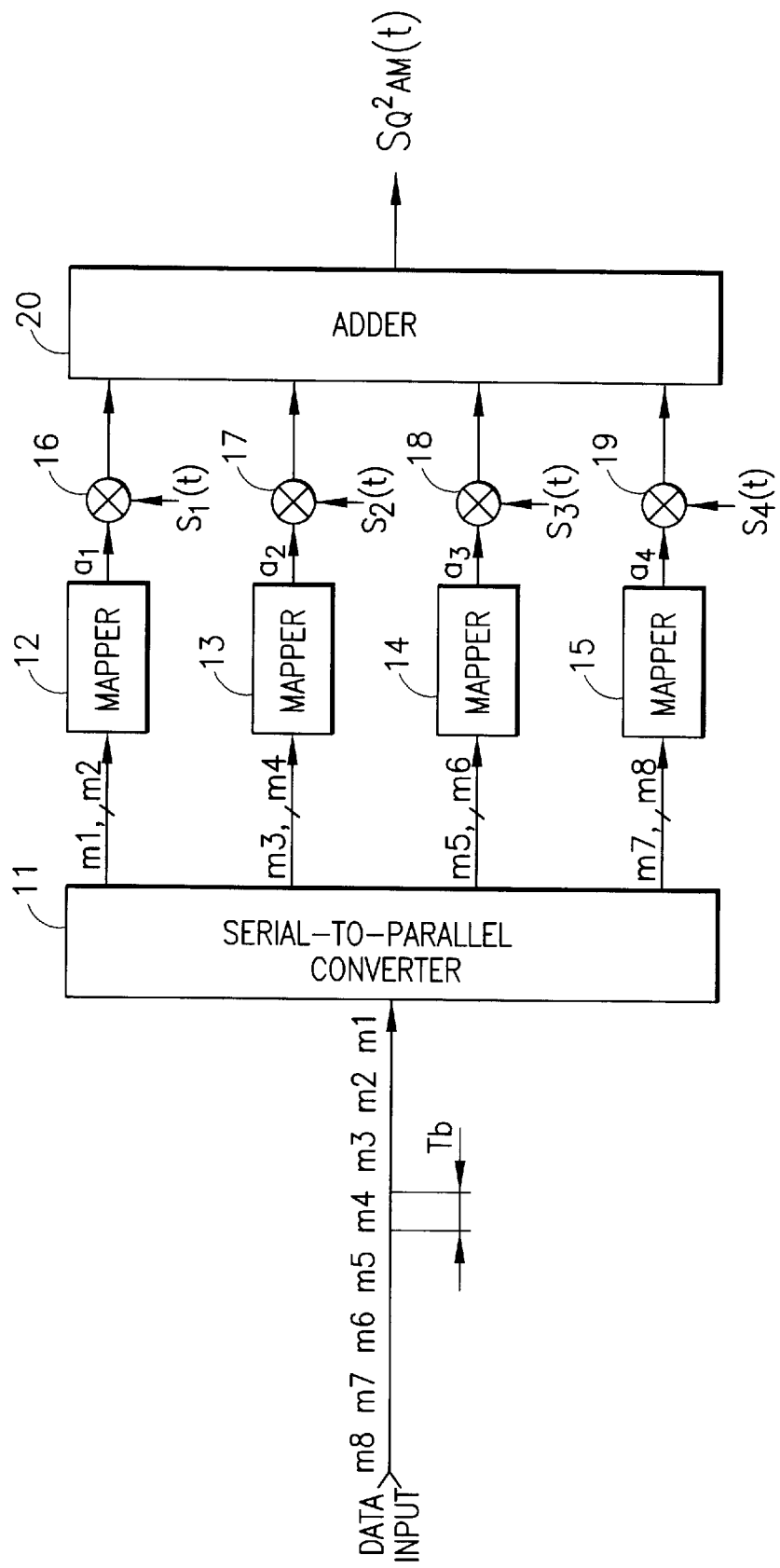
FIG. 1 is a block diagram of a usual $Q^2AM$ system.
Figure 2:
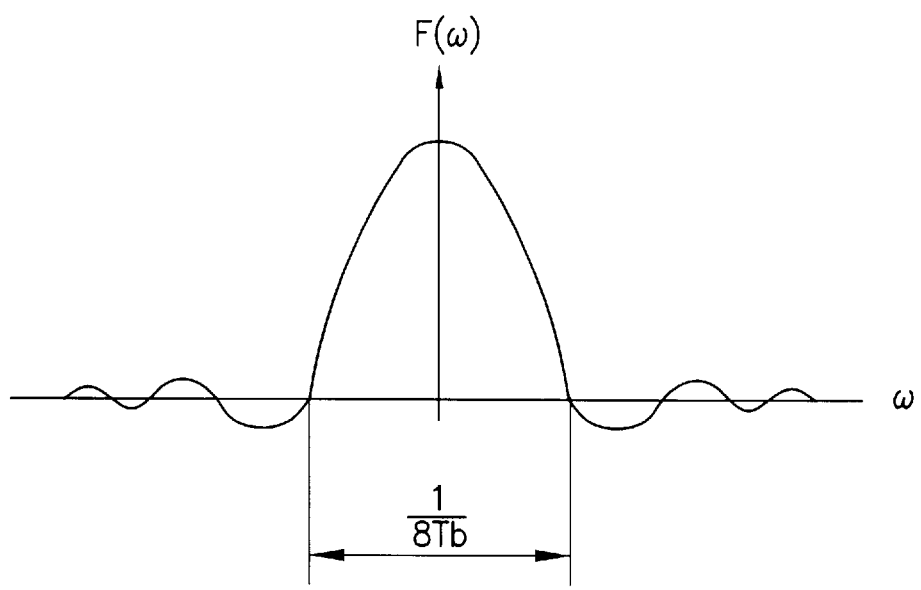
FIG. 2 is a graph showing bandwidth efficiency of a $Q^2AM$ system.

As shown in FIG. 1, modulated signal, $[S_{Q^2AM}(t)]$, which is output by adder 20 and expressed as the formula 5, is newly defined as the formula 6.

$$S_{Q^2AM}(t) = \left[\alpha_1(t)\sin\left(\frac{\pi t}{2T}\right) + \alpha_2(t)\cos\left(\frac{\pi t}{2T}\right)\right]\cos\omega_0 t + \left[\alpha_3(t)\sin\left(\frac{\pi t}{2T}\right) + \alpha_4(t)\cos\left(\frac{\pi t}{2T}\right)\right]\sin\omega_0 t = A(t)\sin(\omega_0 t + \theta(t)) \quad \text{[Formula 6]}$$

where $\alpha_1$ to $\alpha_4$, which are respectively generated by mappers 12 to 15, have values of ±1 and ±3. The envelope $A(t)$ of the modulated signal, $[S_{Q^2AM}(t)]$, is expressed as the following formula 7.

$$A(t) = \sqrt{\left[\alpha_1(t)\sin\left(\frac{\pi t}{2T}\right) + \alpha_2(t)\cos\left(\frac{\pi t}{2T}\right)\right]^2 + \left[\alpha_3(t)\sin\left(\frac{\pi t}{2T}\right) + \alpha_4(t)\cos\left(\frac{\pi t}{2T}\right)\right]^2} \quad \text{[Formula 7]}$$

This formula can be newly expressed as $$A(t) = \sqrt{\left[\sqrt{\alpha_1^2(t)+\alpha_2^2(t)}\sin\left(\frac{\pi t}{2T}+\theta_1\right)\right]^2 + \left[\sqrt{\alpha_3^2(t)+\alpha_4^2(t)}\cos\left(\frac{\pi t}{2T}-\theta_1\right)\right]^2}$$

$$= \sqrt{[\alpha_1^2(t)+\alpha_2^2(t)]\sin^2\left(\frac{\pi t}{2T}+\theta_1\right) + [\alpha_3^2(t)+\alpha_4^2(t)]\cos^2\left(\frac{\pi t}{2T}-\theta_2\right)}$$

[Formula 8]

where, $$\theta_1 = \tan^{-1}\left[\frac{\alpha_2(t)}{\alpha_1(t)}\right], \quad \theta_2 = \tan^{-1}\left[\frac{\alpha_3(t)}{\alpha_4(t)}\right]$$

[Formula 9]

If $\alpha_1^2(t)+\alpha_2^2(t)=E_1(t)$, $\alpha_3^2(t)+\alpha_4^2(t)=E_2(t)$, and $E_1(t)=E_2(t)=E(t)$, the formula 8 can be expressed as the following formula 10.

$$A(t) = \sqrt{E(t)[\sin^2(x+\theta_1)+\cos^2(x-\theta_2)]}$$

[Formula 10]

If $\theta_1 = -\theta_2$, the envelope of a $Q^2AM$ signal has a constant value.

Therefore, the condition for a constant envelope derived from the above formulas can be expressed as the following formulas 11 and 12.

$$|\alpha_1(t)| = |\alpha_4(t)|, \quad |\alpha_2(t)| = |\alpha_3(t)|$$

[Formula 11]

$$\frac{\alpha_2(t)}{\alpha_1(t)} = \frac{\alpha_3(t)}{\alpha_4(t)}$$

[Formula 12]

The values, $\alpha_1$ to $\alpha_4$, output by mappers 12 to 15, are not predetermined, but change according to the 2-bit data to be transmitted, so it is impossible to satisfy the constant envelope characteristic, using the 8-bit data, which will be modulated.

The present invention limits the data, which will be transmitted, to 4-bit, and adds 4-bit parity to make the output signal have the constant envelope. In this invention, even though a data transmission rate decreases by ½, since a minimum Hamming distance increases, a signal-to-noise ratio can be improved.

The following table 2 shows correspondence regulations of mappers 12 to 15 designed according to the constant envelope conditions which are obtained from the formulas 11 and 12. The table 3 shows the codes generated according to the table 2 and corresponding values output by mappers 12 to 15. In the tables 2 and 3, Mi signifies data, and Pi signifies a parity bit.

TABLE 2

Correspondence Regulation of Constant Envelop Mapper

| Mapper 1 | | | Mapper 2 | | | Mapper 3 | | | Mapper 4 | | |
|---|---|---|---|---|---|---|---|---|---|---|---|
| M1 | M2 | output | P1 | M3 | output | M4 | P2 | output | P3 | P4 | output |
| 0 | 0 | +3 | 0 | 0 | +1 | 0 | 0 | +1 | 0 | 0 | −3 |
| 0 | 1 | +1 | 0 | 1 | +3 | 0 | 1 | −3 | 0 | 1 | +1 |
| 1 | 0 | −1 | 1 | 0 | −3 | 1 | 0 | +3 | 1 | 0 | −1 |
| 1 | 1 | −3 | 1 | 1 | −1 | 1 | 1 | −1 | 1 | 1 | +3 |

TABLE 3

Code and Output of Mapper

| Sign Language | | | | | | | | Mapper 1 Output | Mapper 2 Output | Mapper 3 Output | Mapper 4 Output |
|---|---|---|---|---|---|---|---|---|---|---|---|
| Mapper 1 Input bit | | | Mapper 2 Input bit | | Mapper 3 Input bit | | Mapper 4 Input bit | | | | |
| M1 | M2 | M3 | P1 | M4 | P2 | P3 | P4 | $\alpha_1(t)$ | $\alpha_2(t)$ | $\alpha_3(t)$ | $\alpha_4(t)$ |
| 0 | 0 | 0 | 0 | 0 | 0 | 0 | 0 | +3 | +1 | +1 | −3 |
| 0 | 1 | 0 | 1 | 0 | 1 | 0 | 1 | +1 | +3 | −3 | +1 |
| 0 | 0 | 1 | 1 | 0 | 0 | 1 | 1 | +3 | −1 | +1 | +3 |
| 0 | 1 | 1 | 0 | 0 | 1 | 1 | 0 | +1 | −3 | −3 | −1 |
| 0 | 0 | 0 | 0 | 1 | 1 | 1 | 1 | +3 | +1 | −1 | +3 |
| 0 | 1 | 0 | 1 | 1 | 0 | 1 | 0 | +1 | +3 | +3 | −1 |
| 0 | 0 | 1 | 1 | 1 | 1 | 0 | 0 | +3 | −1 | −1 | −3 |
| 0 | 1 | 1 | 0 | 1 | 0 | 0 | 1 | +1 | −3 | +3 | +1 |
| 1 | 1 | 1 | 1 | 1 | 1 | 1 | 1 | −3 | −1 | −1 | +3 |
| 1 | 0 | 1 | 0 | 1 | 0 | 1 | 0 | −1 | −3 | +3 | −1 |
| 1 | 1 | 0 | 0 | 1 | 1 | 0 | 0 | −3 | +1 | −1 | −3 |
| 1 | 0 | 0 | 1 | 1 | 0 | 0 | 1 | −1 | +3 | +3 | +1 |
| 1 | 1 | 1 | 1 | 0 | 0 | 0 | 0 | −3 | −1 | +1 | −3 |
| 1 | 0 | 1 | 0 | 0 | 1 | 0 | 1 | −1 | −3 | −3 | +1 |
| 1 | 1 | 0 | 0 | 0 | 0 | 1 | 1 | −3 | +1 | +1 | +3 |
| 1 | 0 | 0 | 1 | 0 | 1 | 1 | 0 | −1 | +3 | −3 | −1 |

Figure 5:
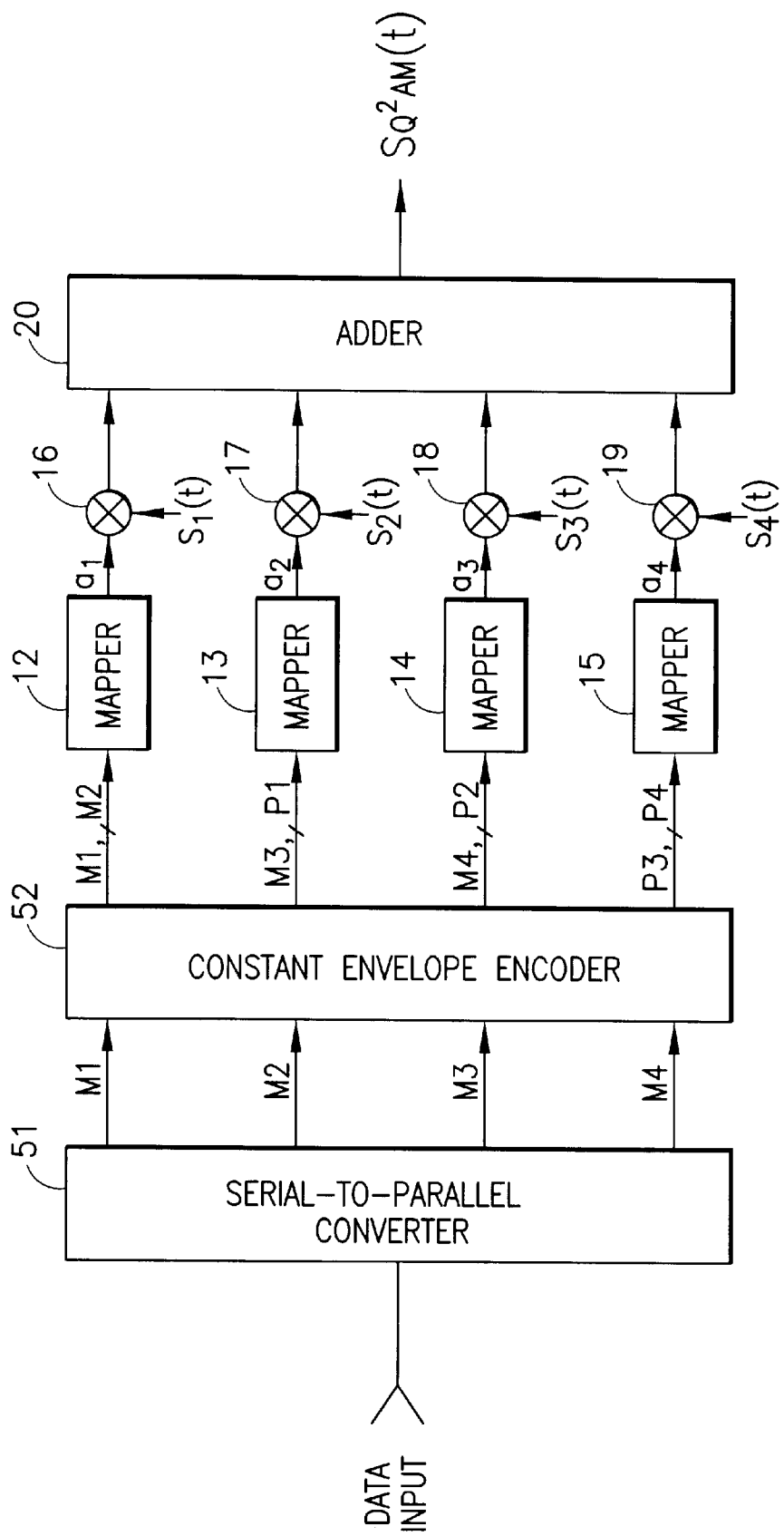
FIG. 5 is a block diagram of an apparatus for a CE-$Q^2AM$ system according to the present invention.

FIG. 5 is a block diagram of an apparatus for a CE-$Q^2$AM according to the present invention. In FIG. 5, the same reference number is attached to the same component as shown in FIG. 1, and the detailed description will be omitted.

Serial-to-parallel converter 51 receives 4-bit data in serial (M1, M2, M3, M4) and outputs them in parallel. Constant envelope encoder 52 adds predetermined parity bits, P1 through P4, to the 4-bit data (M1, M2, M3, M4) transmitted by serial-to-parallel converter 51, and generates 8-bit data (M1 to M4, P1 to P4) having the constant envelope.

Constant envelope encoder 52 adds 4-bit parity, P1 through P4, to the 4-bit data (M1, M2, M3, M4) according to the coding regulation shown in the table 3, thus generating 8-bit data having the constant envelope.

Figure 6:
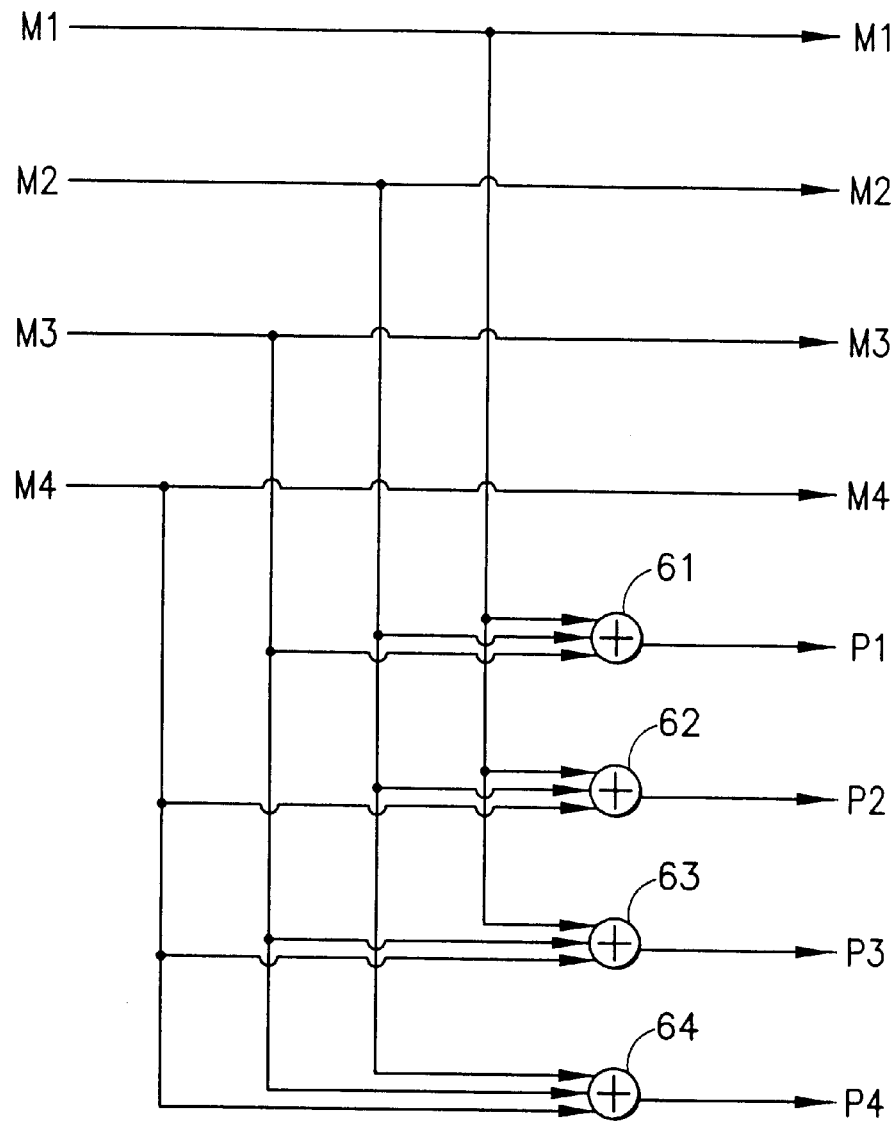
FIG. 6 illustrates an exemplary embodiment of the constant envelope encoder shown in FIG. 5.

FIG. 6 illustrates a configuration of constant envelope encoder 52.

Modulo-2 adders, or exclusive ORs, 61 to 64, perform an exclusive OR operation with input data. Modulo-2 adder 61 generates the first parity bit P1 based upon the input data, M1, M2, M3. Modulo-2 adder 62 generates the second parity bit P2 based upon the input data, M1, M2, M4. Modulo-2 adder 63 generates the third parity bit P3 based upon the input data, M1, M3, M4. Modulo-2 adder 64 generates the fourth parity bit P4 based upon the input data, M2, M3, M4.

Figure 7:
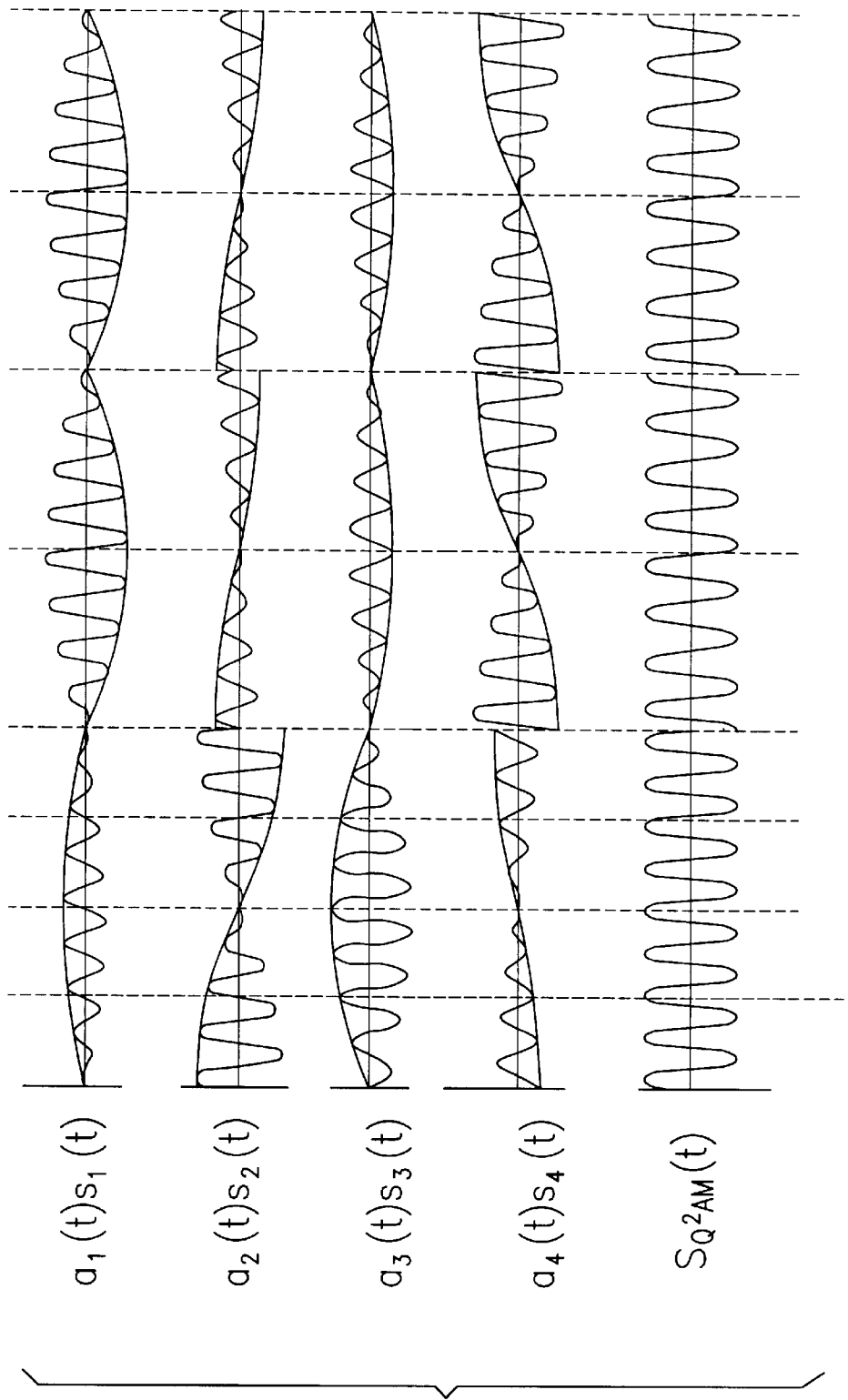
FIG. 7 illustrates output waveforms of the CE-$Q^2AM$ according to the present invention.

Since four parity bits, P1 through P4, having the constant envelope, are added to the 4-bit input data (M1 to M4) in this $Q^2$AM system, the signal, $S_{Q^2AM}$, generated from Adder 20 which sums up the modulated signals $\alpha_1(t)S_1(t)$ to $\alpha_4(t)S_4(t)$ shown in FIG. 7 which are output by mixers 16 to 19, always has the constant envelope.

Figure 3:
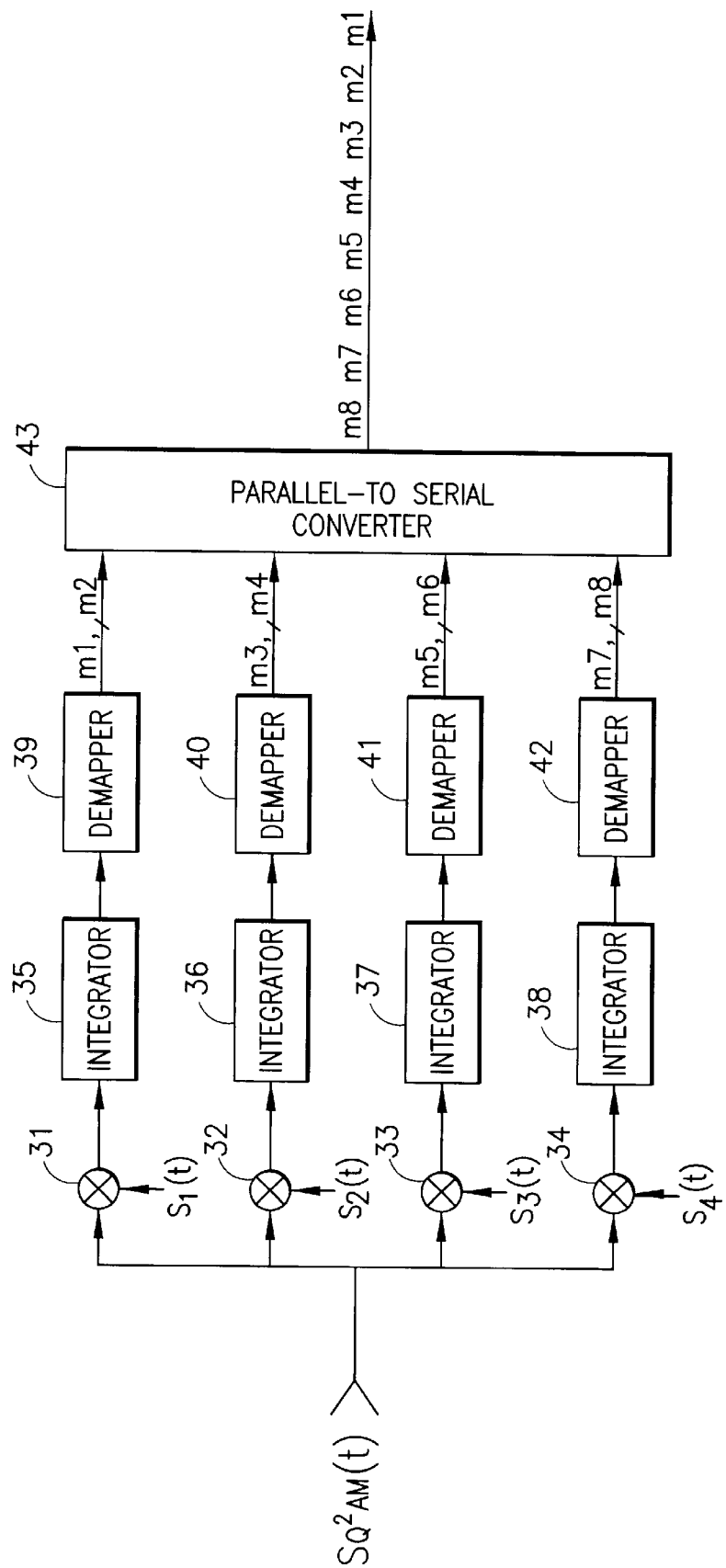
FIG. 3 is a block diagram of a demodulator for demodulating $Q^2AM$ signals.
Figure 4:
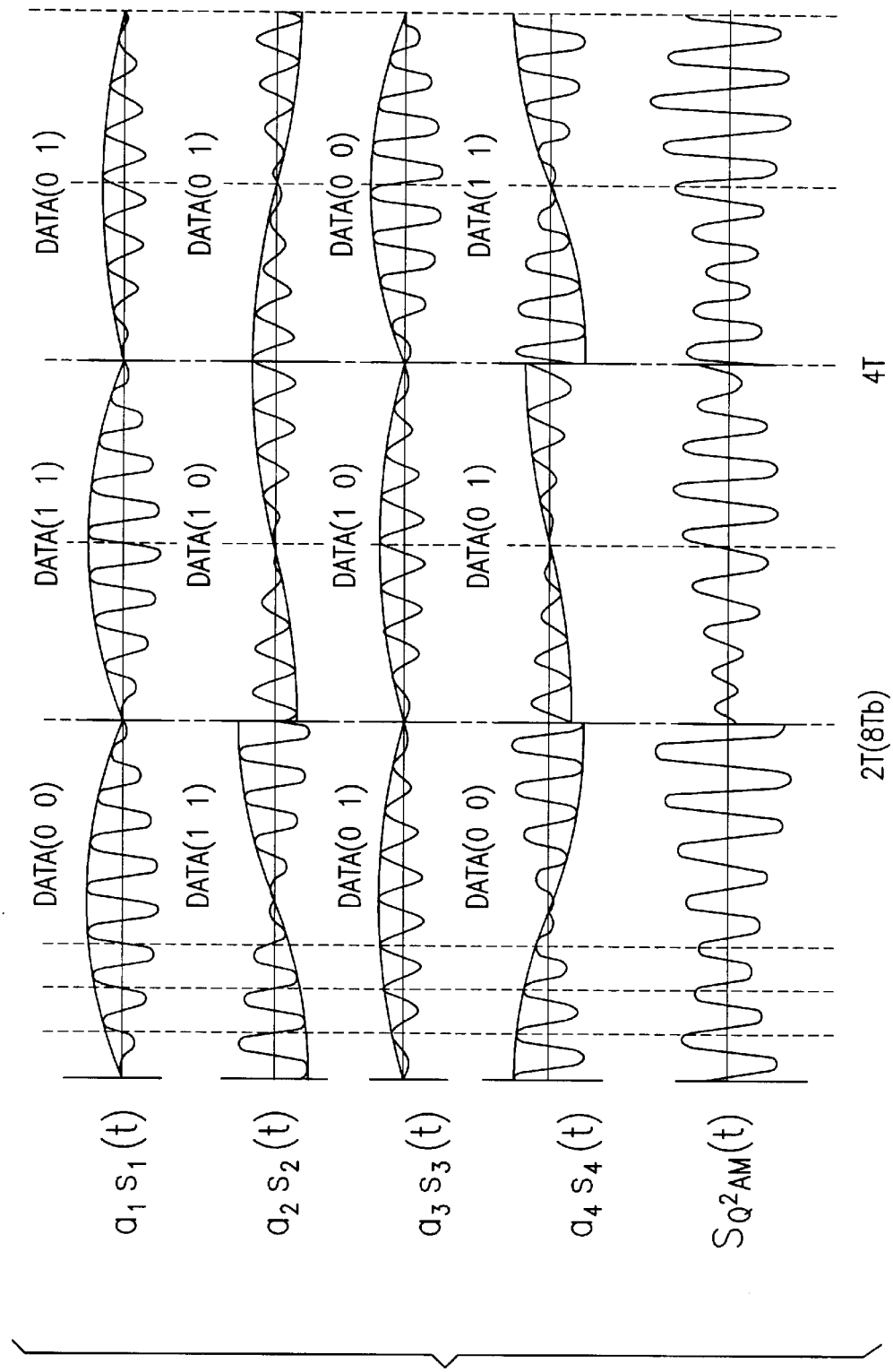
FIG. 4 illustrates waveforms of modulated signals showing the problems of the conventional $Q^2AM$ system.
Figure 8:
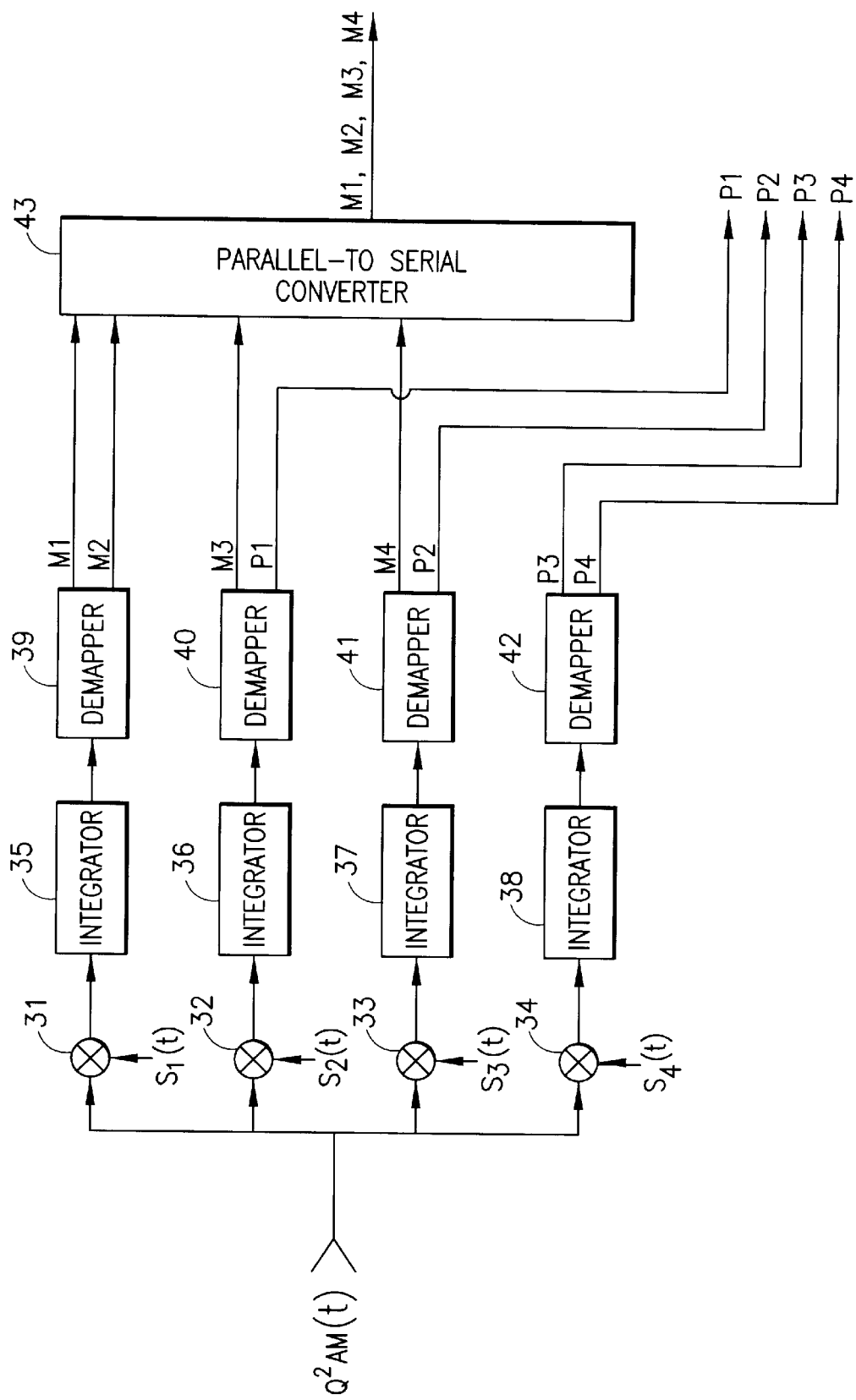
FIG. 8 is a block diagram of a demodulator according to the present invention.

FIG. 8 is a block diagram of a demodulator for demodulating the signals output by the modulator. This demodulator of FIG. 8 has the almost same configuration as that of FIG. 3, except that parallel-to-serial converter 43 receives only information bits M1 to M4 output by demappers 39 to 41 and outputs them in parallel. The parity bits P1 to P4, which are output by demappers 40 to 42, are output through an another port.

Consequently, the constant envelope in an output frequency signal can be implemented only by appending a constant envelope encoder for only converting transmission data in the modulation method according to the above embodiment.

Figure 9:
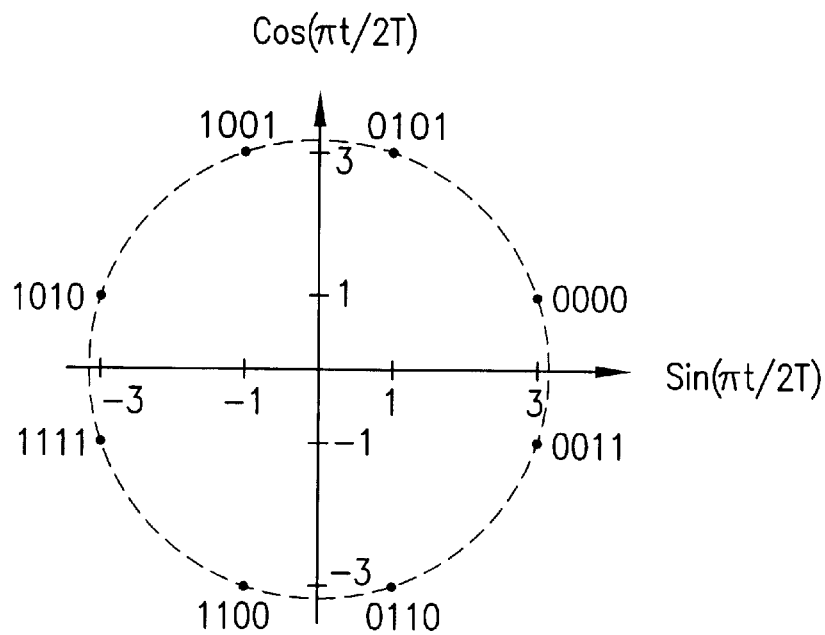
FIGS. 9 and 10 are constellation points diagrams of CE-$Q^2AM$ system according to the present invention.

FIG. 9 is a constellation points diagram of a $Q^2AM$ system according to the present invention. Constellation points are positioned at a same distance from the central point, showing the fact that the constant envelope characteristic is implemented.

However, in this signal constellation, the distance between constellation points "0000" and "0011" is nearer than the distance between constellation points "0101" and "0000". This limits the system efficiency.

According to our research, when establishing the translation level of data bit modulation to ±1.21 and ±2.92, not to conventional values ±1 and ±3, the optimal distribution of constellation points is achieved, thus increasing a minimum distance of about 10%, and obtaining a relatively good minimum distance in the ranges of ±1.18 to ±1.25 and ±2.90 to ±2.95.

The following table 4 shows the translation level relation.

TABLE 4

| Mapper 1 | | | Mapper 2 | | | Mapper 3 | | | Mapper 4 | | |
|---|---|---|---|---|---|---|---|---|---|---|---|
| M1 | M2 | output | P1 | M3 | output | M4 | P2 | output | P3 | P4 | output |
| 0 | 0 | +2.92 | 0 | 0 | +1.21 | 0 | 0 | +1.21 | 0 | 0 | −2.92 |
| 0 | 1 | +1.21 | 0 | 1 | +2.92 | 0 | 1 | −2.92 | 0 | 1 | +1.21 |
| 1 | 0 | −1.21 | 1 | 0 | −2.92 | 1 | 0 | +2.92 | 1 | 0 | −1.21 |
| 1 | 1 | −2.92 | 1 | 1 | −1.21 | 1 | 1 | −1.21 | 1 | 1 | +2.92 |

Figure 10:
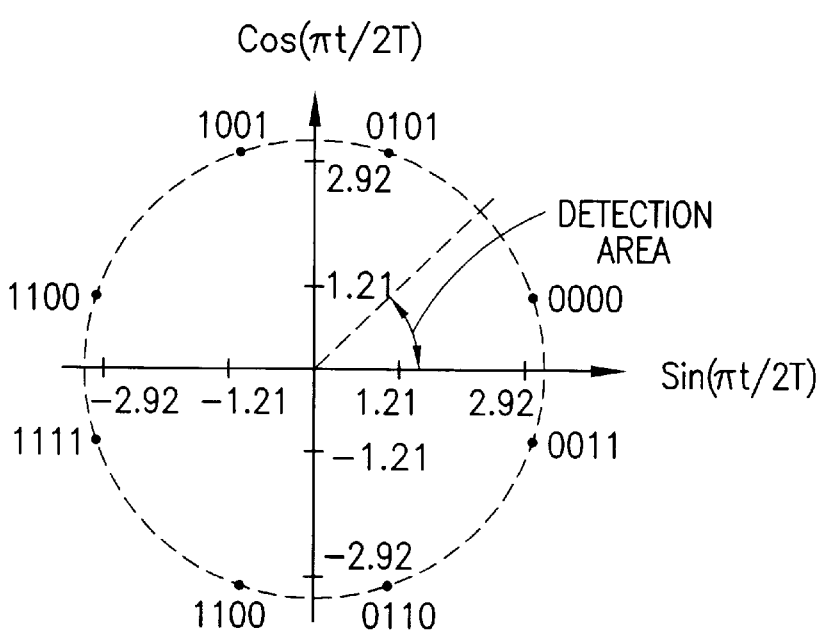

FIG. 10 shows how constellation points are distributed when the translation levels of data bits are limited to ±1.21 and ±2.92 as shown in the table 4. Compared with FIG. 9, constellation points in FIG. 10 are uniformly distributed, thus the minimum distance is increased.

As illustrated above, the present invention can provide a method for a $CE-Q^2AM$, which is applicable to a non-linear communication system by making the $Q^2AM$ system of high bandwidth efficiency have a constant envelope. In the above exemplary embodiment, a minimum Hamming distance ($H_{min}$) increases because of the parity bits which are added for implementing the constant envelope characteristic, thus Euclidean distance, or non-identification of signal waveforms, increases.

Usually, a symbol error rate ($P^*_E$) against S/N (signal-to-noise ratio) can be approximately expressed through the following formula.

$$P^*_E \simeq 1 - \int_{-\pi/M}^{\pi/M} \sqrt{\frac{\gamma}{\pi}} \cos\theta e^{-\gamma \sin^2\theta} d\theta \quad \text{[Formula 13]}$$

The Formula 13 becomes $$P^*_E \simeq 1 - \left(1 - \int_{\sqrt{\gamma}\sin\pi/M}^{\infty} \sqrt{\frac{\gamma}{\pi}} \cos\theta e^{-u^2} du\right),$$

and is newly expressed as $$P^*_E \simeq \text{erfc}\left(\sqrt{\gamma} \sin\frac{\pi}{M}\right),$$

so the symbol error rate ($P^*_E$) is given by the following $$P^*_E = 2Q\left(\sqrt{\frac{2E_s}{N_0}} \sin\frac{\pi}{M}\right) \quad \text{[Formula 14]}$$

where $\gamma$ is S/N, M is the number of constellation points, and $E_s$ is average symbol energy.

When considering the Hamming distance, the symbol error rate is given by the following Formula 15.

$$2Q\left(\sqrt{\frac{H_{min} \times R \times 2E_s}{N_0}} \cdot \sin\frac{\pi}{M}\right) \quad \text{[Formula 15]}$$

where $H_{min}$ is a minimum Hamming distance, and R is a coding rate.

In this $Q^2AM$ method according to the present invention, the minimum Hamming distance is 4, and the coding rate is ⁴⁄₈, thus the Formula 15 is expressed as the following Formula 16.

$$2Q\left(\sqrt{\frac{2 \times 2E_s}{N_0}} \cdot \sin\frac{\pi}{M}\right) \quad \text{[Formula 16]}$$

Euclidean distance according to Formula 16 is 1.41 times, or $\sqrt{2}$ times, as great as that according to Formula 14.

Figure 11:
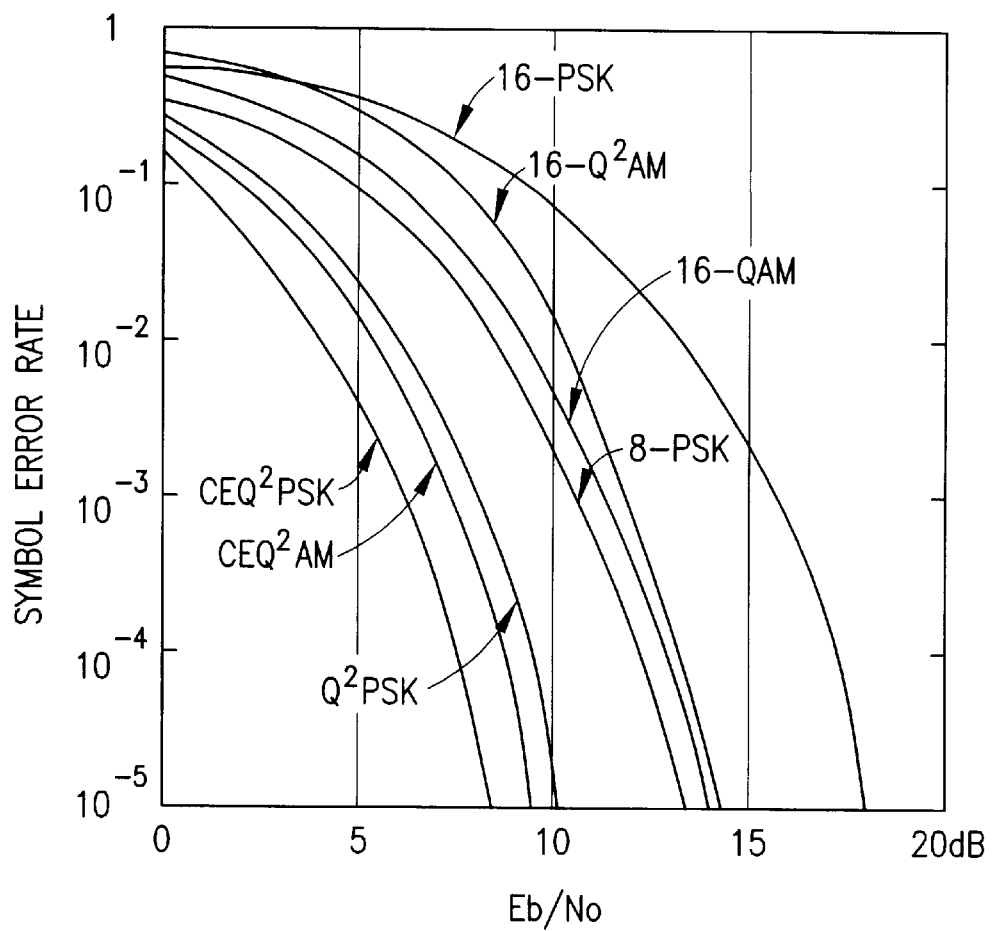
FIG. 11 is a graph for explaining a symbol error rate in the CE-$Q^2AM$ system according to the present invention.

FIG. 11 is a characteristic curve diagram showing symbol error rates according to each digital modulation system. Compared with the conventional $CE-Q^2PSK$ system, although the 16 $CE-Q^2AM$ system according to the present invention requires more $E_b/N_o$ as much as 1.1 dB, the bandwidth efficiency increases by 1.33. When compared with the conventional 16 QAM system, the bandwidth efficiency is equal, but the present invention not only implements the constant envelope characteristic, but also is better in its performance by about 4.4 dB at SER=$10^{-5}$.

As illustrated above, the present invention can provide a $Q^2AM$ method and apparatus implementing a constant envelope characteristic. Additionally, the present invention can provide a $Q^2AM$ system having a better system performance, compared with a conventional $Q^2AM$ system.

It will be apparent to those skilled in the art that various modifications and variations can be made in a $CE-Q^2AM$ method and apparatus of the present invention without deviating from the spirit or scope of the invention. Thus, it is intended that the present invention cover the modifications and variations of this invention provided they come within the scope of the appended claims and their equivalents.

What is claimed is:

1. A method for a quadrature-quadrature amplitude modulation ($Q^2AM$) which modulates data bits in the unit of 8-bit before transmission, the method adding 4-bit parity to 4-bit information.

2. The method according to claim 1, wherein the parity bits make the 4-bit information have a constant envelope.

3. A method for a $Q^2AM$ comprising the steps of:
inputting a predetermined number of information bits;
adding a predetermined number of parity bits to the information bits, wherein the parity bit makes data bits, where it is contained, have a constant envelope; and
performing the $Q^2AM$ with the data bits to which the parity bits are added.

4. A method for a $Q^2AM$ comprising the steps of:
inputting 4-bit information;
adding 4-bit parity to the information bits to make 8-bit data having a constant envelope;
converting the 8-bit data into corresponding level signals in the unit of 2-bit;
mixing the level signals with different predetermined frequency signals, respectively; and
adding up signals obtained through the mixing step.

5. The method according to claim 4, wherein, if translation levels corresponding to each 2-bit data, generated through the converting step, are $\alpha_1$, $\alpha_2$, $\alpha_3$, and $\alpha_4$, the parity bits which are added to the information bits satisfy $|\alpha_1|=|\alpha_4|$, $|\alpha_2|=|\alpha_3|$, and $$\frac{\alpha_2}{\alpha_1} = -\frac{\alpha_3}{\alpha_4}.$$

6. The method according to claim 4, wherein the level signals respectively have at least one level value among the values of −1, +1, −3, and +3.

7. The method according to claim 4, wherein the level signals respectively have at least one level value among the values of −1.18 to −1.25, +1.18 to +1.25, −2.90 to −2.95, and +2.90 to +2.95.

8. The method according to claim 4, wherein the level signals respectively have at least one level value among the values of −1.21, +1.21, −2.92, and +2.92.

9. The method according to claim 7, wherein the level signals respectively have at least one level value among the values of −1.21, +1.21, −2.92, and +2.92.

10. An apparatus for a $Q^2AM$ comprising:
encoding means for adding 4-bit parity to 4-bit input information;
first, second, third, and fourth mapping means for respectively generating level signals corresponding to data values of 2-bit among 8-bit data generated by the encoding means;
first, second, third, and fourth mixers for respectively mixing the level signals generated by the four mapping means with different predetermined frequency signals; and
adding means for adding up the signals generated by the four mixers.

11. The apparatus according to claim 10, wherein the mapping means respectively convert 2-bit input data into at least one level signal among values of −1, +1, −3, and +3.

12. The apparatus according to claim 10, wherein the mapping means respectively convert 2-bit input data into at least one level signal among the values of −1.18 to −1.25, +1.18 to +1.25, −2.90 to −2.95, and +2.90 to +2.95.

13. The apparatus according to claim 10, wherein the mapping means respectively convert 2-bit input data into at least one level signal among the values of −1.21, +1.21, −2.92, and +2.92.

14. The apparatus according to claim 12, wherein the first and second mapping means respectively convert 2-bit input data into at least one level signal among the values of −1.21, +1.21, −2.92, and +2.92.

15. The apparatus according to claim 10, wherein the encoding means generates the parity bits, based upon the 4-bit input information.

16. The apparatus according to claim 10, wherein if translation levels corresponding to each 2-bit data generated by the four mapping means are $\alpha_1$, $\alpha_2$, $\alpha_3$, and $\alpha_4$, the encoding means adds the parity bits which satisfies $|\alpha_1|=|\alpha_4|$, $|\alpha_2|=|\alpha_3|$, and $$\frac{\alpha_2}{\alpha_1} = -\frac{\alpha_3}{\alpha_4}.$$

17. The apparatus according to claim 15, wherein the encoding means includes a modulo-2 adder.

18. The apparatus according to claim 16, wherein the encoding means includes a modulo-2 adder.

* * * * *